United States Patent
Watanabe et al.

[11] Patent Number: 5,381,838
[45] Date of Patent: Jan. 17, 1995

[54] FUEL INLET DEVICE FOR A FUEL TANK

[75] Inventors: Hideo Watanabe; Shoji Takahashi; Takeshi Suzuki, all of Saitama; Masatoshi Oikawa, Kanagawa, all of Japan

[73] Assignees: Honda Giken Kogyo Kabushiki Kaisha; Nifco, Inc., Japan

[21] Appl. No.: 177,875

[22] Filed: Jan. 5, 1994

[30] Foreign Application Priority Data

Jan. 11, 1993 [JP] Japan .................. 5-019353

[51] Int. Cl.⁶ .................. B65B 1/30; B65B 3/28
[52] U.S. Cl. .................. 141/198; 141/212; 141/217; 141/229; 220/86.2
[58] Field of Search .......... 141/198, 211, 212, 217, 141/218, 220, 223, 229; 220/86.2; 137/409, 592, 448

[56] References Cited

U.S. PATENT DOCUMENTS

| | | | |
|---|---|---|---|
| 2,340,936 | 2/1944 | Cook | 141/198 |
| 4,444,230 | 4/1984 | Van Mullem | 141/198 |
| 4,630,749 | 12/1986 | Armstrong et al. | 220/86.2 |
| 4,667,711 | 5/1987 | Draft | 141/198 |
| 4,974,645 | 12/1990 | Johnson | 141/198 |
| 5,152,315 | 10/1992 | Lagache | 137/448 |

*Primary Examiner*—Henry J. Recla
*Assistant Examiner*—Steven O. Douglas
*Attorney, Agent, or Firm*—Skjerven, Morrill, MacPherson, Franklin, & Friel

[57] ABSTRACT

In a fuel inlet device for a fuel tank, a flap valve is provided at an end of a fuel filler tube opening into the fuel tank, and a float which rises with a rise in a surface level of the fuel in the tank closes this flap valve when the fuel surface level has reached a prescribed level. Thus, when the surface level of the fuel in the fuel tank has reached a prescribed level, the flap valve linked with the float is closed, and prevents any more fuel from being filled into the fuel tank because the filling nozzle detects this rise in the surface level of the fuel in the filler tube, and stops filling any more fuel into the tank. Therefore, it is possible to connect the breather tube in the fuel tank directly with a canister device without the intervention of a relief valve, and the internal pressure of the fuel tank can be maintained substantially no higher than the atmospheric pressure. Thus, the release of fuel vapor from the filler cap can be avoided.

3 Claims, 2 Drawing Sheets 5,381,838

FUEL INLET DEVICE FOR A FUEL TANK

TECHNICAL FIELD

The present invention relates to a fuel inlet device for a fuel tank.

BACKGROUND OF THE INVENTION

An automotive fuel tank is normally provided with a breather tube for the purpose of allowing air and/or fuel vapor to escape from the fuel tank. One end of the breather tube is located in a relatively high position inside the fuel tank while the other end is communicated with a canister device for absorbing fuel vapor and diverting it to the intake system of the internal combustion engine by suitable means. A relief valve is provided in the breather tube which allows the gas vapor in the fuel tank to escape into the canister device only when the pressure inside the fuel tank has risen above the atmospheric pressure by a certain degree.

When the fuel tank is being filled up with fuel, the vapor of the fuel is trapped in an upper part of the fuel tank in which the associated end of the breather tube opens into. When the fuel tank is substantially completely filled up, and the associated end of the breather tube is closed by the surface of the fuel, the internal pressure of the fuel tank above the surface level of the fuel starts rising sharply, and no further filling of fuel into the tank is possible because the fuel surface level of the fuel filler tube starts rising sharply, and this rise in the fuel surface level in the filler tube is detected by a sensor provided in the fuel pump nozzle inserted in the inlet end of the filler tube, thereby stopping the filling of fuel from the fuel pump.

Because the canister device is only capable of absorbing a limited amount of fuel vapor and is not capable of absorbing fuel in liquid form, the set pressure of the valve must be high enough to prevent the fuel in the fuel tank from reaching the canister device. As a result, the set pressure of the relief valve is such that the internal pressure of the fuel tank may reach a level which is substantially higher than the atmospheric pressure. Therefore, when the fuel cap is opened, typically for filling fuel into the fuel tank, the vapor in the fuel tank often placed under a substantial pressure tends to be released to the atmosphere by a substantial amount, and this is not desirable for the environment.

Therefore, it is conceivable to control the internal pressure of the fuel tank to be no higher than the atmospheric pressure by eliminating the valve in the passage leading to the canister device. However, this will create the problem that some of the fuel may flow into the canister device when filling the fuel tank with fuel.

BRIEF SUMMARY OF THE INVENTION

In view of such problems of the prior art, a primary object of the present invention is to provide a fuel inlet device for a fuel tank which can prevent fuel gas from being released from the filler cap when it is opened, and can thus avoid polluting the environment.

A second object of the present invention is to provide a fuel inlet device for a fuel tank which can maintain the internal pressure of the fuel tank substantially no higher than the atmospheric pressure during the operation of the user of the fuel tank, typically an internal combustion engine.

A third object of the present invention is to provide a fuel inlet device for a fuel tank which can prevent fuel from being excessively filled into the fuel tank.

A fourth object of the present invention is to provide a fuel inlet device for a fuel tank which can allow the fuel surface level in the filler tube to rise quickly when the fuel tank is appropriately filled up with fuel, thereby preventing the fuel from entering the breather tube by an excessive amount.

These and other objects of the present invention can be accomplished by providing a fuel inlet device for a fuel tank equipped with a fuel filler tube and a breather tube, comprising: means for detecting a surface level of fuel accommodated in the fuel tank; and means for closing an internal end of the filler tube when the surface level detecting means has detected that the surface level has exceeded a certain prescribed level. According to a preferred embodiment of the present invention, there is provided a fuel inlet device for a fuel tank equipped with a fuel filler tube and a breather tube, comprising: a float which rises with a rise in a surface level of fuel accommodated in the fuel tank; a valve provided at an end of the fuel filler tube opening into the fuel tank; and linking means for linking the movements of the float and the valve with each other; wherein the valve is closed by an ascending movement of the float when the surface level of fuel in the fuel tank has reached a prescribed level.

Thus, when the surface level of the fuel in the fuel tank has reached a prescribed level, the valve linked with the float is closed, and prevents any more fuel from being filled into the fuel tank, because the filling nozzle detects this rise in the surface level of the fuel in the filler tube extending from the filler cap to the fuel tank, and stops filling any more fuel into the tank.

Preferably, the valve comprises a flap valve which is normally closed by biasing means, a biasing force of the biasing means being weak enough to allow the flap valve to be opened by an incoming flow of fluid through the fuel filler tube. This flap valve also contributes to the prevention of the release of fuel vapor. So that the novel inlet device may be conveniently mounted in the existing structure of a fuel tank, the fuel inlet device may comprise a sleeve member connected to the end of the filler tube opening into the fuel tank, the flap valve and the float being pivotally supported by pivot means extending in lower parts of the sleeve in a mutually parallel relationship.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
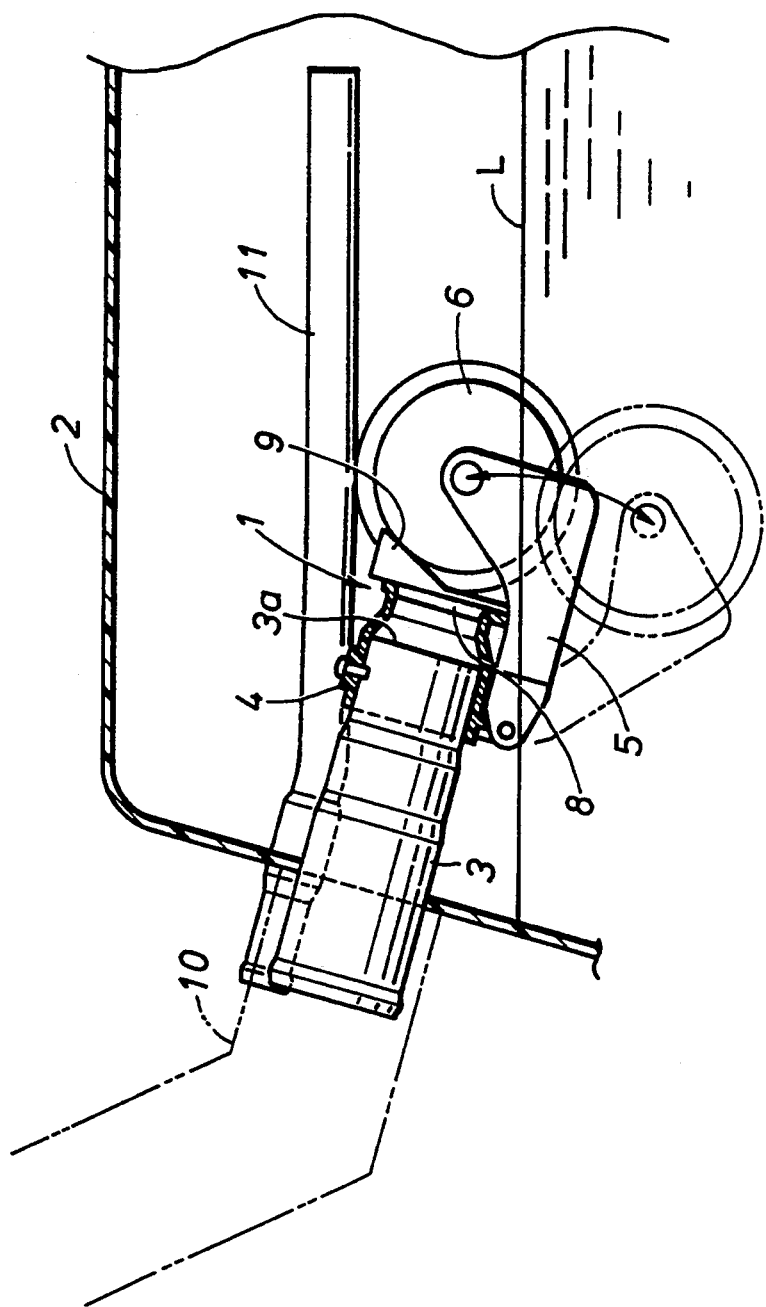
FIG. 1 is a partly broken away side view of the preferred embodiment of the fuel inlet device according to the present invention when the fuel tank is being filled up.
Figure 2:
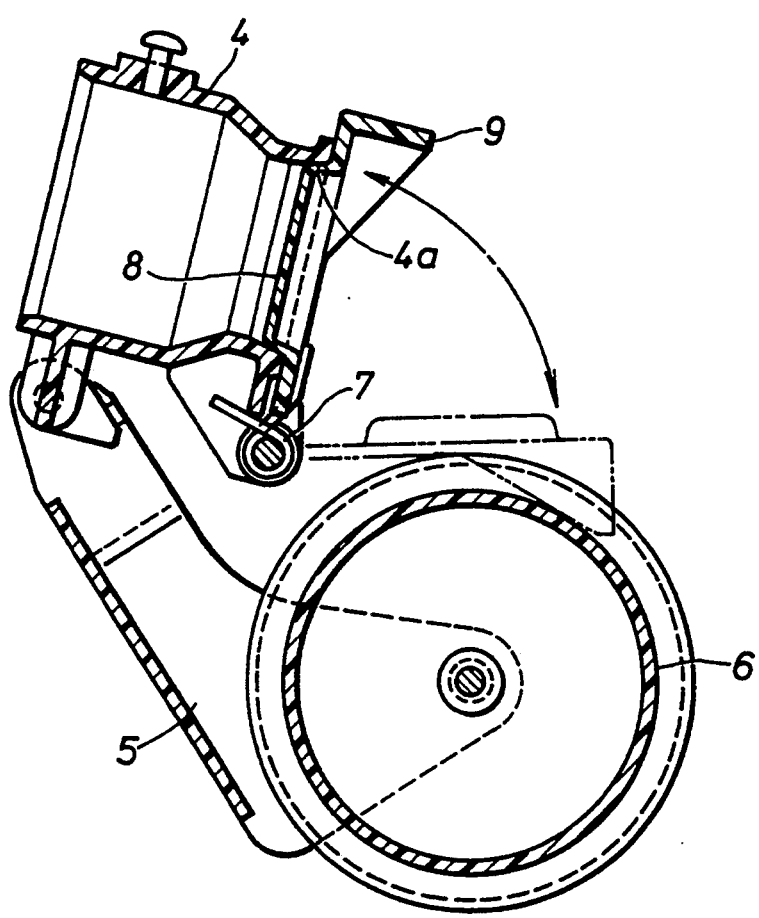
FIG. 2 is a sectional side view of the fuel inlet device when the float has fully descended.

FIGS. 1 and 2 show the preferred embodiment of the fuel inlet device according to the present invention as applied to an automotive fuel tank 2. This fuel inlet device 1 is fixedly secured to an internal end 3a of a filler tube joint 3 opening into the fuel tank 2. The fuel inlet device 1 comprises a sleeve member 4 connecting the fuel inlet device 1 to the associated end 3a of the filler tube joint 3, an arm 5 pivotally secured to a lower part of the sleeve 4 so as to be vertically rotatable, a float 6 fixedly secured to a free end of the arm 5, and a flap valve 8 provided in an end 4a of the sleeve 4 opening into the fuel tank 2. The flap valve 8 normally closes the associated end 4a of the sleeve 4 by being biased by a torsion coil spring 7.

The spring force of the torsion spring 7 is weak enough to allow the flap valve 8 to be opened by the pressure from the fuel flowing into the fuel tank 2. The external face of the flap valve 8 is provided with a projection 9 which abuts the outer surface of the float 6 as the float 6 approaches its fully ascended position. When the float 6 has substantially reached its fully ascended position, the flap valve 8 is closed by the buoyant force of the float 6 transmitted via the projection 9.

When the fuel level L in the fuel tank 2 is low and the float 6 is at its fully descended position as indicated by the imaginary line in FIG. 1 and as illustrated in FIG. 2, the float 6 and the flap valve 8 are spaced from each other. In this condition, the flap valve 8 is closed by the spring force of the torsion coil spring 7 as indicated by the solid lines in FIG. 1. When fuel normally consisting of gasoline is filled into the fuel tank 2 in this condition by inserting a fuel filling nozzle (not shown in the drawings) of a fuel pump in the filler tube 10, the pressure of the fuel flowing into the filler tube 10 pushes open the flap valve 8 against the spring force of the torsion coil spring 7, and allows the fuel to be filled into the fuel tank 2. During this filling process, any excess air from the space above the surface level L can escape from the fuel tank 2 via a breather tube 11 substantially in the same way as in the conventional fuel tank system.

As more fuel is filled into the fuel tank 2, and the surface level L rises, the float 6 rises higher eventually abutting upon the projection 9 of the flap valve 8. As a result, the flap valve 8 is closed as indicated by the solid lines in FIG. 1, and additional fuel issuing from the fuel filler nozzle is trapped in the filler tube 10. The fuel filler nozzle is normally equipped with a sensor for detecting the surface level, and upon detecting the rise in the fuel level in the filler tube 10 stops feeding fuel any further.

Thus, according to the present invention, the fuel inlet is closed upon detection of the fuel surface level L in the fuel tank 2 by means of the float 6, and the highest fuel surface level is determined without regard to the internal pressure of the fuel tank 2. Therefore, according to the present invention, it is not necessary to provide a relief valve in the passage leading to a canister device or, even when a valve is provided, it is not necessary to set a threshold pressure level to be substantially higher than the atmospheric pressure for the purpose of preventing the excessive releasing of fuel into the canister device. Therefore, it is possible to maintain the internal pressure of the fuel tank no more higher than the atmospheric pressure, and can thus prevent fuel vapor from being released to the environment when the fuel cap is opened for the purpose of filling fuel into the fuel tank.

Although the present invention has been described in terms of preferred embodiments thereof, it is obvious to a person skilled in the art that various alterations and modifications are possible without departing from the scope of the present invention which is set forth in the appended claims.

What we claim is:

1. A fuel inlet device for a fuel tank equipped with a fuel filler tube and a breather tube, comprising:
    a float adapted to rise with a rise in a surface level of fuel accommodated in the fuel tank;
    a valve adapted to extend from an end of an opening in the fuel filler tube into the fuel tank;
    linking means for linking the movement of the float and the valve with each other;
    wherein said valve is adapted to close by an ascending movement of said float when the surface level of fuel in the fuel tank has reached a prescribed level; and
    wherein said valve comprises a flap valve which is normally closed by biasing means, a biasing force of said biasing means being weak enough for allowing said flap valve to be opened by an incoming flow of fluid fuel through the fuel filler tube.

2. A fuel inlet device according to claim 1, wherein the breather tube is adapted to be connected to a canister device.

3. A fuel inlet device according to claim 1, further comprising a sleeve member adapted to be connected to the end of the filler tube opening into the fuel tank, said flap valve and said float being pivotally supported by pivot means extending from an underside of said sleeve member in a mutually parallel relationship.

* * * * *